(12) United States Patent
Ciesla et al.

(10) Patent No.: US 9,207,795 B2
(45) Date of Patent: Dec. 8, 2015

(54) USER INTERFACE SYSTEM

(71) Applicant: Tactus Technology, Inc., Fremont, CA (US)

(72) Inventors: Craig Michael Ciesla, Fremont, CA (US); Micah B. Yairi, Fremont, CA (US); Nathaniel Mark Saal, Fremont, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

(21) Appl. No.: 14/514,134

(22) Filed: Oct. 14, 2014

(65) Prior Publication Data

US 2015/0029126 A1    Jan. 29, 2015

Related U.S. Application Data

(63) Continuation of application No. 12/975,337, filed on Dec. 21, 2010, now Pat. No. 8,922,503, which is a continuation-in-part of application No. 12/497,622, filed on Jul. 3, 2009, now Pat. No. 8,179,375, which is (Continued)

(51) Int. Cl.
*G06F 3/041* (2006.01)
*G06F 3/044* (2006.01)

(Continued)

(52) U.S. Cl.
CPC .............. *G06F 3/041* (2013.01); *G06F 3/0202* (2013.01); *G06F 3/03547* (2013.01); *G06F 3/044* (2013.01); *G06F 3/04886* (2013.01); *G06F 3/04895* (2013.01); *G06F 2203/04809* (2013.01)

(58) Field of Classification Search
CPC ... F06D 3/04895; F06D 3/0202; F06D 3/044; F06D 3/04886; F06D 3/03547; F06D 2203/04809

See application file for complete search history.

(56) References Cited

U.S. PATENT DOCUMENTS 3,034,628 A   5/1962   Wadey
3,659,354 A   5/1972   Sutherland (Continued)

FOREIGN PATENT DOCUMENTS

CN   1260525 A   7/2000
CN   1530818 A   9/2004

(Continued)

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

(Continued)

*Primary Examiner* — Patrick F Marinelli
(74) *Attorney, Agent, or Firm* — Jeffrey Schox

(57) ABSTRACT

Disclosed is a user interface system that includes a sheet that defines a surface and at least partially defines a fluid vessel arranged underneath the surface, a volume of fluid within the fluid vessel, a displacement device that influences the volume of the fluid within the fluid vessel to expand and contract at least a portion of the fluid vessel, thereby deforming a particular region of the surface, and a sensor system that is configured to receive a user input on the surface with a first sensitivity and configured to receive a user input substantially proximal to the particular region of the surface at with second sensitivity higher than the first sensitivity.

5 Claims, 9 Drawing Sheets

Related U.S. Application Data a continuation-in-part of application No. 11/969,848, filed on Jan. 4, 2008, now Pat. No. 8,547,339, said application No. 12/975,337 is a continuation-in-part of application No. 12/319,334, filed on Jan. 5, 2009, now Pat. No. 8,154,527.

(60) Provisional application No. 61/288,826, filed on Dec. 21, 2009.

(51) Int. Cl.
*G06F 3/02* (2006.01)
*G06F 3/0354* (2013.01)
*G06F 3/0488* (2013.01)
*G06F 3/0489* (2013.01)

(56) References Cited

U.S. PATENT DOCUMENTS

| | | |
|---|---|---|
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,772,205 A | 9/1988 | Chlumsky et al. |
| 4,920,343 A | 4/1990 | Schwartz |
| 4,940,734 A | 7/1990 | Ley et al. |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A | 3/1996 | Garner |
| 5,496,175 A | 3/1996 | Oyama et al. |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | Maclean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |

(56) References Cited

U.S. PATENT DOCUMENTS

| | | |
|---|---|---|
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |

(56) References Cited

U.S. PATENT DOCUMENTS

| | | |
|---|---|---|
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,749,489 B2 | 6/2014 | Ito et al. |
| 2001/0008396 A1 | 7/2001 | Komata |
| 2001/0043189 A1 | 11/2001 | Brisebois et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0243998 A1 | 10/2009 | Wang |
| 2009/0250267 A1 | 10/2009 | Heubel et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |

(56) References Cited

U.S. PATENT DOCUMENTS

| | | |
|---|---|---|
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2014/0160063 A1 | 6/2014 | Yairi et al. |
| 2014/0160064 A1 | 6/2014 | Yairi et al. |

FOREIGN PATENT DOCUMENTS

| | | |
|---|---|---|
| CN | 1882460 A | 12/2006 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| KR | 20000010511 | 2/2000 |
| KR | 100677624 B | 1/2007 |
| WO | 2004028955 A2 | 4/2004 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporateinews/070831.html.

Jeong et al., "Tunable Microdoublet Lens Array," Optical Society of America, Optics Express; vol. 12, No. 11. May 31, 2004, 7 Pages.

Preumont, A. Vibration Control of Active Structures: An Introduction, Jul. 2011.

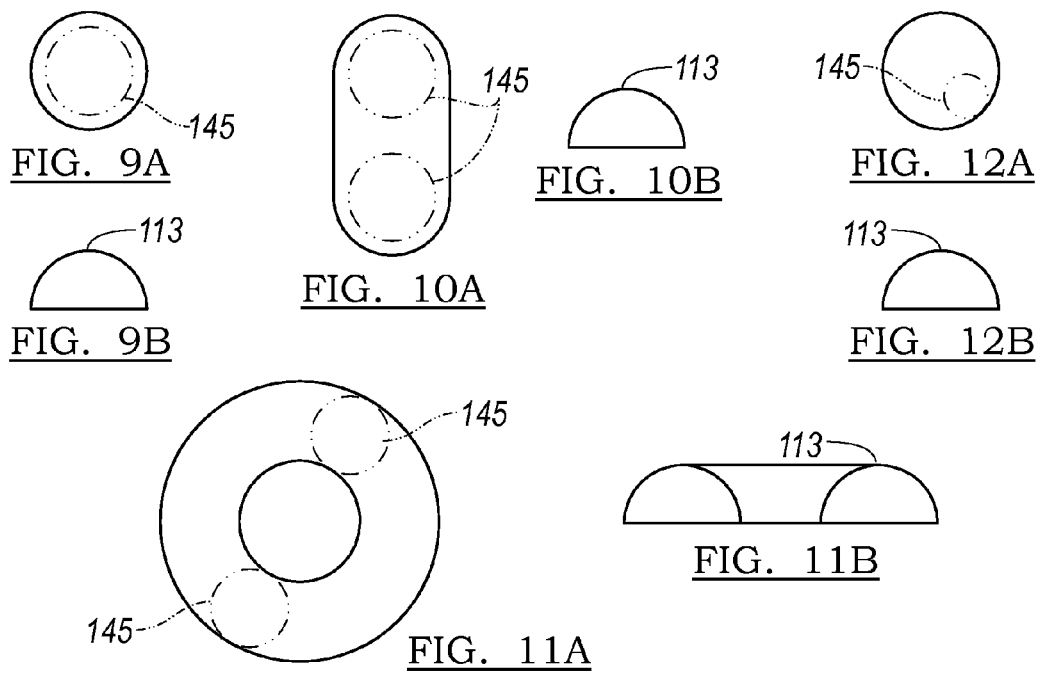
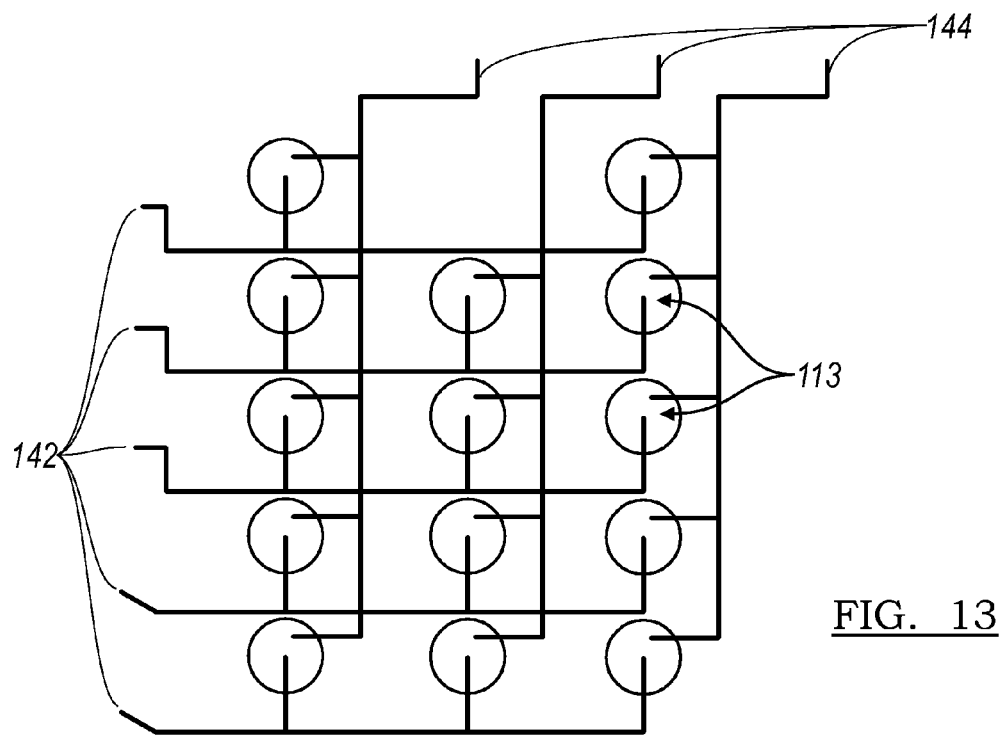

USER INTERFACE SYSTEM

CROSS-REFERENCE TO RELATED APPLICATIONS

This application is continuation of prior application Ser. No. 12/975,337 filed on 21 Dec. 2010, which is a continuation in part of prior application Ser. No. 12/497,622 filed on 3 Jul. 2009, now issued as U.S. Pat. No. 8,179,375, which is a continuation in part of prior application Ser. No. 11/969,848, filed on 4 Jan. 2008, now issued as U.S. Pat. No. 8,547,339, and application Ser. No. 12/975,337 is a continuation in part of prior application Ser. No. 12/319,334, filed on 5 Jan. 2009, now issued as U.S. Pat. No. 8,154,527, and claims the benefit of U.S. Provisional Application No. 61/288,826, filed on 21 Dec. 2009, all of which are incorporated in their entirety by this reference.

TECHNICAL FIELD

This invention relates generally to touch sensitive user interfaces, and more specifically to an improvement of the user interface of U.S. application Ser. No. 12/497,622.

BRIEF DESCRIPTION OF THE FIGURES

FIGS. 9a, 9b, 10a, 10b, 11a, 11b, 12a, and 12b are top and side views of a button deformation, a slider deformation, a slider ring deformation, a guide deformation, and a pointing stick deformation, respectively.

FIG. 13 is a variation of the sensor as described in U.S. application Ser. No. 12/497,622.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1A:
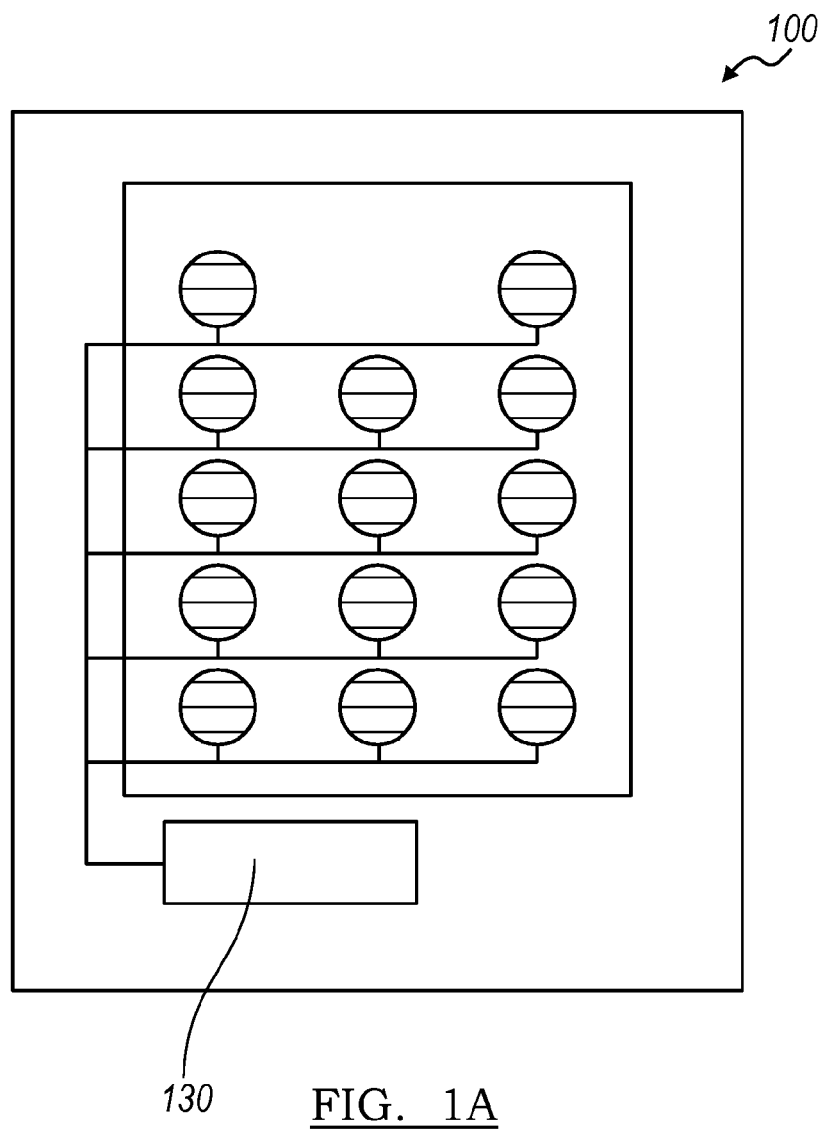
FIGS. 1a and 1b are a top view of the user interface system of a preferred embodiments and a cross-sectional view illustrating the operation of a button array in accordance to the preferred embodiments, respectively.
Figure 1B:
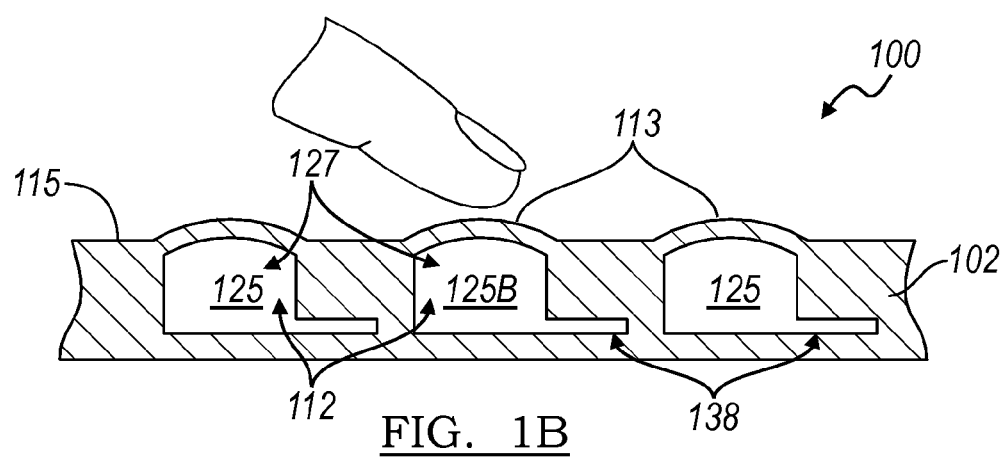
Figure 2A:
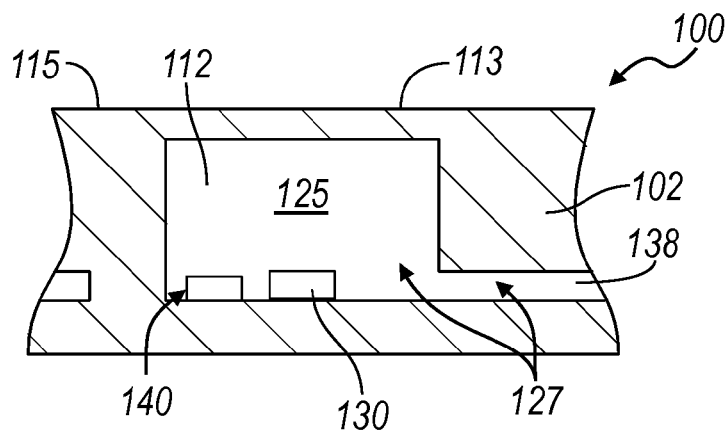
FIGS. 2a, 2b, and 2c are cross-sectional views of the retracted, extended, and user input modes of the preferred embodiments, respectively.
Figure 2B:
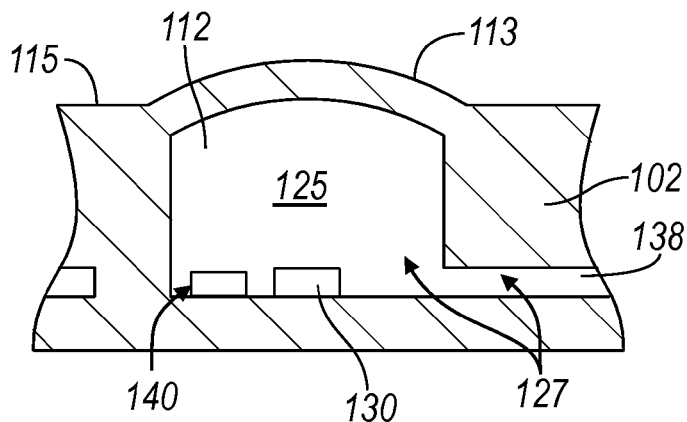
Figure 2C:
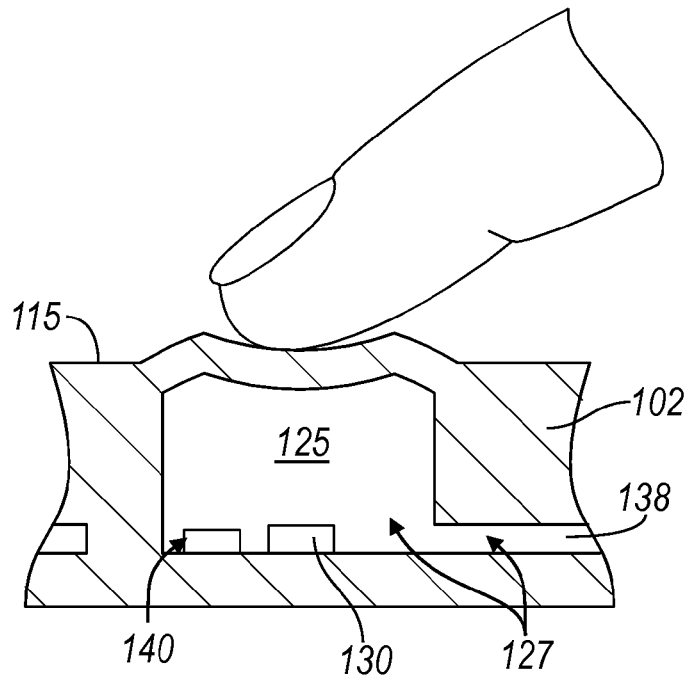
Figure 3:
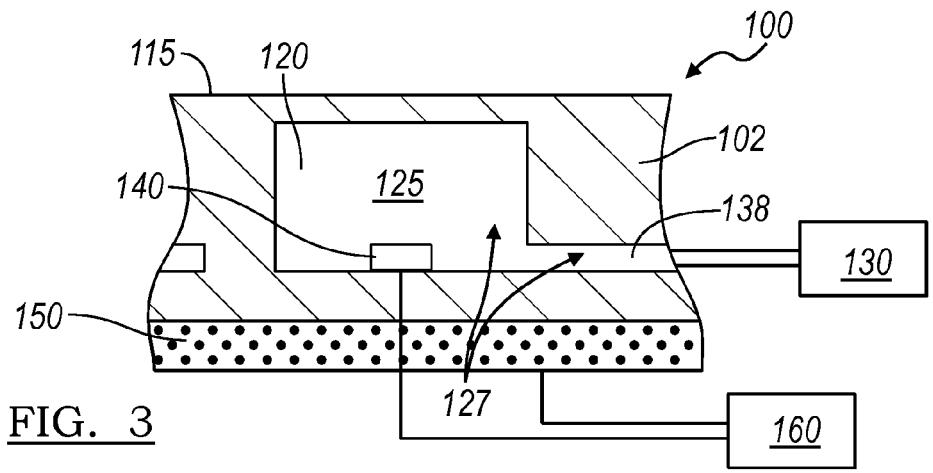
FIG. 3 is a cross-sectional view of the sheet, the cavity, the sensor, and the display of the preferred embodiments.
Figure 4A:
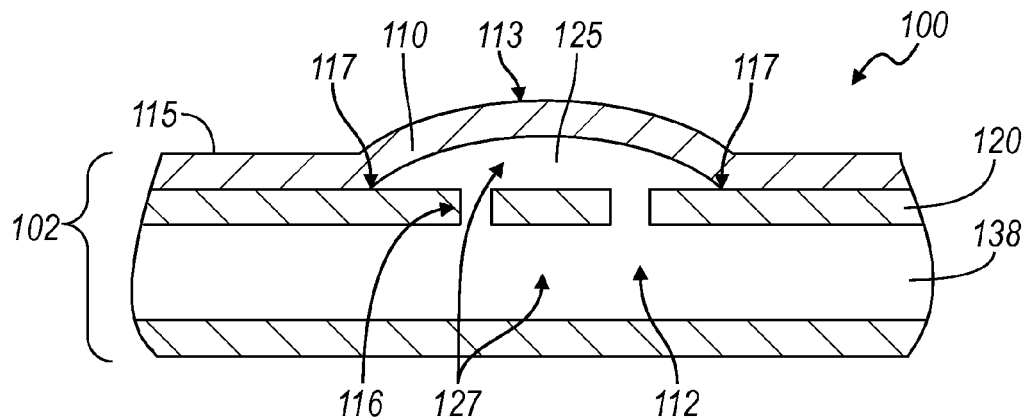
FIGS. 4a, 4b, and 4c are cross-sectional views of the sheet split into a layer portion and a substrate portion.

As shown in FIGS. 1 and 2, the user interface system 100 of the preferred embodiments includes a sheet 102 that defines a surface 115 and a fluid vessel 127, a volume of a fluid 112 contained within the fluid vessel 127, a displacement device 130 that modifies the volume of the fluid 112 to expand at least a portion of the fluid vessel 127 (thereby outwardly deforming a particular region 113 of the surface 115), and a capacitive sensor system 140 that receives a user input on the surface 115 at a first sensitivity and receives a user input substantially proximal to the particular region of the surface at a second sensitivity higher than the first sensitivity. As shown in FIG. 3, the user interface system may also include a processor 160 that functions to detect the user input and/or to evaluate the user input received by the capacitive sensor system 140. The processor 160 is preferably coupled to the capacitive sensor system 140 to receive signals from the capacitive sensor system 140. The processor 160 may also be coupled to the displacement device 130 to send signals to the displacement device 130. As shown in FIG. 3, the user interface system 100 may also include a display 150 coupled to the sheet 102 and adapted to output images to the user. In this variation, the processor 160 may also be coupled to the display 150 to control the display 150. The capacitive sensor system 140 may also be located in between the sheet 102 and the display 150 and may alternatively include a plurality of sensor components that are located in various locations within the user interface system 100. However, any other suitable arrangement of the components of the system 100 may be used. As shown in FIGS. 1b and 2, the fluid vessel 127 is preferably a cavity 125 and the displacement device 130 preferably influences the volume of fluid within the cavity 125 to expand and retract the cavity 125. The fluid vessel 127 may alternatively be a channel 138 or a combination of a channel 138 and a cavity 125, as shown in FIG. 4a. The fluid vessel 127 may also include a second cavity 125b that contains a volume of fluid 112 and the displacement device 130 preferably also influences the volume of the fluid within the second cavity 125b to expand and retract the second cavity 125b, thereby deforming a second particular region 113 of the surface 115. The displacement device 130 preferably influences the volume of fluid 112 within the second cavity 125b independently of the cavity 125, but may alternatively influence the volumes of fluid 112 within both cavity and second cavity 125 and 125b substantially concurrently. Alternatively, the user interface enhancement system 100 may include a second displacement device 130 that functions to influence the volume of fluid 112 within the second cavity 125b to expand and retract the second cavity 125b, thereby deforming a second particular region 113 of the surface. The second cavity 125b is preferably similar or identical to the cavity 125, but may alternatively be any other suitable type of cavity.

The user interface system 100 of the preferred embodiments has been specifically designed to be used as the user interface for an electronic device, more preferably in an electronic device that features an adaptive user interface. The electronic device, which may or may not include a display, may be an automotive console, a desktop computer, a laptop computer, a tablet computer, a television, a radio, any suitable appliance, a desk phone, a mobile phone, a PDA, a personal navigation device, a personal media player, a camera, a watch, a remote, a mouse, a trackpad, or a keyboard. The user interface system 100 may, however, be used as the user interface for any suitable device that interfaces with a user in a tactile and/or visual manner. As shown in FIG. 2, the surface 115 of the user interface system 100 preferably remains flat until a tactile guidance is to be provided at the location of the particular region 113. The surface 115 of the user interface system 100 may also be deformed when a user input is required. At that time, the displacement device 130 may increase the volume of the fluid within the fluid vessel 127 (or at the cavity 125) to deform and/or expand the particular region 113 outward, preferably forming a button-like shape. With the button-like shape, the user will have tactile guidance when navigating for the expanded particular region 113 and will have tactile feedback when applying force onto the particular region 113 to provide input. The capacitive sensor system 140 preferably senses a user input that inwardly deforms the particular region 113, but may alternatively a user input that inwardly deforms any other suitable region along the surface 115 and/or any other user input that does not inwardly deform the surface 115. However, any other arrangement of the user interface system 100 suitable to providing tactile guidance and/or detecting user input may be used.

As shown in FIG. 3, the user interface system 100 may be display 150 that displays an image. As described above, the volume of fluid 112 and/or the capacitive sensor system 140 preferably cooperates with the sheet 102 to transmit an image through the sheet 102 without substantial obstruction. Alternatively, the volume of fluid 112 may cooperate with the sheet 102 to transmit an image through the sheet 102 without substantial obstruction only when the fluid vessel 127 is in a particular state, for example, when the fluid vessel 127 is in the retracted state or when the fluid vessel is in the expanded state. Because the deformation of the particular region 113 functions to provide tactile guidance to the user, the user may not need the visual cues from the image to operate the user interface when tactile guidance is present. However, the volume of fluid 112 and the sheet 102 may cooperate to transmit an image through the sheet 102 without substantial obstruction in any other suitable arrangement. Obstruction to image transmission may be defined as any manipulation of the image that provides a visual interruption of the image in reaching the user. Obstruction may include blocking a substantial portion of the image, substantially dimming the image, and/or substantially distorting the image unintelligibly. Manipulations to an image that are preferably not considered obstruction to image transmission may include distortion of the image while allowing the image to be substantially visually intelligible, substantially uniformly tinting the image, and/or substantially uniformly enlarging the image. In a first variation, to decrease distortion of the image, the volume of fluid 112 and the sheet 102 preferably cooperate to allow the light from the display to reach the user's eyes at substantially the same angle from the sheet 102 as directly from the display 150 such that an image from the display is seen through the sheet 102 as it would be seen directly from the display. In a second variation, the volume of fluid 112 and sheet 102 may function to substantially uniformly refract light from the display to maintain substantially the same relative proportions between different regions of the image as seen by the user. For example, the volume of fluid 112 and the sheet 102 may cooperatively function to substantially magnify the image from the display of the device 10 thus increasing the size of the image as seen by the user uniformly or increasing the size of one portion of the image more than another portion. In a third variation, the volume of fluid 112 and sheet 102 may cooperate to refract light from different portions of the image differently (i.e., "warp" the image) to increase the magnification of certain portions of the image. For example, the fluid 112 and the sheet 102 may cooperate to provide a fish-eye type magnification to the image to substantially increase visibility of certain portions of the image. In the first, second, and third variations, the volume of fluid 112 and sheet 102 are preferably each of substantially the same index of refraction to maintain substantially one refraction angle of the light from the display as the light transmits through the sheet 102. Alternatively, the index of refraction of the volume of fluid 112 and the sheet 102 may be substantially different but the fluid 112 and sheet 102 preferably cooperate to decrease detection of the different refraction angles by the user. For example, the volume of fluid 112 may occupy a substantially small percentage of the thickness and/or width of the sheet 102 such that the change in refraction angle in the fluid 112 is substantially undetectable by the user. In a second example, the walls of the channel 138 and/or cavity 125 may be arranged to compensate for differences in the index of refraction between the fluid 112 and the sheet 102, for example, by positioning the walls at a particular angle relative to the sheet 102. Both the sheet 102 and the fluid 112 are preferably substantially transparent to decrease changes in the color and/or intensity of the image. Similarly, the sheet 102 and fluid 112 preferably both include substantially similar light absorptive properties, birefringence properties, and/or chromaticity properties. However, any other suitable translucency, transparency level, absorptive, refraction, and/or any other suitable light transmission properties may be used for the sheet 102 and fluid 112. Similarly, any other suitable method may be used to decrease obstruction to the transmission of an image.

1. The Sheet

As shown in FIGS. 1 and 2, the sheet 102 of the preferred embodiment functions to provide the surface 115 that interfaces with a user in a tactile manner and to at least partially define a fluid vessel 127. As described above, the fluid vessel 127 is preferably a cavity 125 (as shown in FIGS. 1b and 2), but may alternatively be a channel 138 or a combination of a cavity 125 and a channel 138 (as shown in FIG. 4a). The surface 115 is preferably continuous, such that when swiping a finger across the surface 115 a user would not feel any interruptions or seams. Alternatively, the surface 115 may include features that facilitate the user in distinguishing one region from another. The surface 115 is also preferably planar. The surface 115 is preferably arranged in a flat plane, but may alternatively be arranged in a curved plane or on a first plane and then wrapped around to a second plane substantially perpendicular to the first plane, or any other suitable arrangement. The surface 115 may alternatively include lumps, bumps, depressions, textures, or may be a surface of any other suitable type or geometry. The surface 115 also functions to deform upon an expansion of the cavity 125, and to preferably "relax" or "un-deform" back to a normal planar state upon retraction of the cavity 125. In a first version, the sheet 102 contains a first portion that is elastic and a second portion that is relatively inelastic. In a second version, sheet 102 is relatively more elastic in a first portion and relatively less elastic in a second portion and is deformed by the expanded cavity 125 in the relatively more elastic portion. In the first and second version, the first portion and the second portion may be located across the length and width of the sheet 102. Alternatively, the first portion and the second portion may be located along the thickness of the sheet 102. In a third version, the sheet 102 is generally uniformly elastic. In fourth version, the sheet 102 includes or is made of a smart material, for example, a shape memory alloy such as Nickel Titanium (commonly referred to as "Nitinol"), that has a selective and/or variable elasticity or a shape memory polymer that may be activated, for example, by ultra violet light or any other suitable type of activation, to have selective and/or variable elasticity. The sheet 102 is preferably optically transparent, but may alternatively be translucent or opaque. In addition to the transparency, the sheet 102 preferably has the following properties: a high transmission, a low haze, a wide viewing angle, a minimal amount of back reflectance upon the display (if the display is included with the user interface system 100), minimal or low glare in ambient and/or daylight condition, scratch resistant, chemical resistant, stain resistant, relatively smooth (not tacky) to the touch, no out-gassing, and/or relatively low degradation rate when exposed to ultraviolet light. The material may also include properties that change during the usage of the device, for example, in the variation that utilizes shape memory polymer, usage of the device in an environment that includes a wavelength or wavelengths of light that may change the properties of the shape memory polymer desirably. For example, certain parts of the material may change elasticity when exposed to UV light. In a second example, the material may change shape. In this example, the volume of fluid 112 within the fluid vessel 127 preferably substantially conforms to the changed shape of the material. This may allow for light to transmit through the fluid 112 and the material without substantial obstruction. However, any other suitable dynamic physical property may be used. This change in the properties may be temporary, in particular, once the wavelength of light is no longer present, the material preferably reverts back to the original state. Alternatively, the change may be permanent. In this variation, the change is preferably reversible, for example, the material may revert back to the original state when exposed to another wavelength of light. In the variation wherein the sheet 102 is placed over a display, the sheet 102 may also function to decrease reflection and/or refraction of light emitting from the display. However, the sheet 102 may include any other suitable material property.

The sheet 102 is preferably made from a suitable elastic material, including polymers and silicone-based and urethane elastomers such as poly-dimethylsiloxane (PDMS) or RTV Silicone (e.g., Momentive RTV Silicone 615). The sheet 102 may also include coatings to provide properties such as smoothness (for example, low coefficient of friction), hydrophobic and oleophobic characteristics, scratch resistance, scratch concealing, and/or resistance to debris retention. The sheet 102 may also include coatings to provide desired optical properties, such as anti-reflection and anti-glare. Coatings may be applied on the surface 115, but may alternatively be applied on any other suitable surface of the sheet 102. In the version wherein the sheet 102 includes a first portion that is elastic and a second portion that is relatively inelastic, the inelastic portion is preferably made from a material including polymers or glass, for example, elastomers, silicone-based organic polymers such as poly-dimethylsiloxane (PDMS), thermoset plastics such as polymethyl methacrylate (PMMA), and photocurable solvent resistant elastomers such as perfluropolyethers. The sheet 102 may, however, be made of any suitable material that provides the surface 115 that deforms and defines a fluid vessel 127.

Figure 4B:
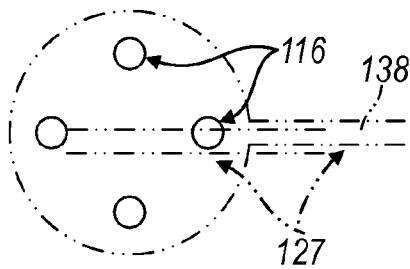
Figure 4C:
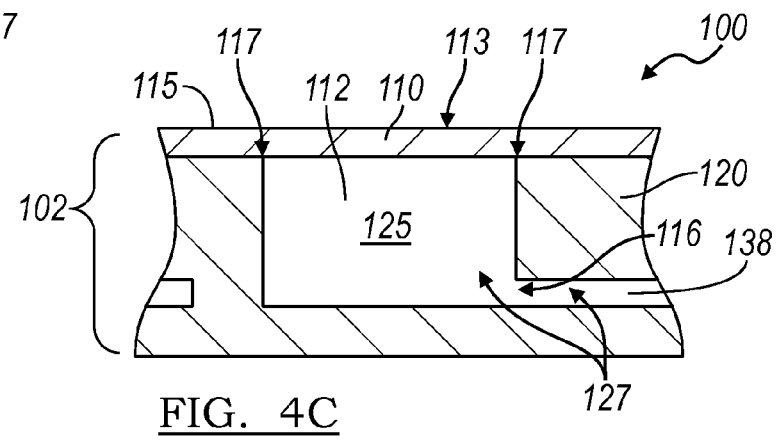

The sheet 102 may be manufactured using well-known techniques for micro-fluid arrays to create one or more cavities and/or micro channels. The sheet 102 may be constructed using multiple layers from the same material or from different suitable materials, for example, the sheet 102 may include a layer portion 110 of one material that defines the surface 115 and a substrate portion 120 of a second material (as shown in FIGS. 4a and 4c). As shown in FIGS. 4a and 4b, the substrate portion 120 preferably defines a fluid outlet 116 that allows fluid to flow between the channel 138 and the cavity 125 to deform and un-deform a particular region of the surface 113. The fluid outlet 116 may be formed into the substrate portion 120, for example, the fluid outlet 116 may be a series of bores that are formed into the substrate in between the channel 138 and the cavity 125 as shown in FIGS. 4a and 4b or an open orifice between the cavity 125 and the channel 138 as shown in FIG. 4c, but may alternatively be a property of the material, for example, the substrate portion 120 may include a porous material that includes a series of interconnected cavities that allow fluid to flow through the substrate portion 120. The substrate portion 120 may define any suitable number of fluid outlets 116 that are of any suitable size and shape. The substrate portion 120 may also include a fluid outlet layer that defines the fluid outlets 116 that is separate from substrate portion 120 and arranged in between the substrate portion 120 and layer portion 110. However, any other suitable arrangement of the fluid outlets 116 may be used. As shown in FIG. 4b, the portion of the substrate portion 120 (or fluid outlet layer) that includes the fluid outlets 116 may also function to provide a support for the layer portion no to substantially prevent the layer portion no from substantially depressing into the channel 138 when force is applied over the particular region 113. However, the substrate portion 120 may be arranged in any other suitable manner and may provide support for the layer portion 110 in any other suitable way.

The layer portion no is preferably attached to the substrate portion 120 (or fluid outlet layer) at an attachment point 117 that at least partially defines the size and/or shape of the particular region 113. In other words, the attachment point 117 functions to define a border between a deformable particular region of the surface 113 and the rest of the surface 115 and the size of the particular region 113 is substantially independent of the size of the cavity 124 and/or the channel 138. The attachment point 117 may be a series of continuous points that define an edge, but may alternatively be a series of non-continuous points. The attachment point 117 may be formed using, for example, adhesive, chemical bonding, surface activation, welding, or any other suitable attachment material and/or method. The method and material used to form the attachment point 117 is preferably of a similar optical property as the layer portion 110 and the substrate portion 120, but may alternatively be of any other optical property. Other portions of the layer portion no and substrate portion 120 not corresponding to a particular region of the surface 113 may also be adhered using similar or identical materials and methods to the attachment point 117. Alternatively, the layer portion 110 and substrate portion 120 may be left unattached in other portions not corresponding to a particular region of the surface 113. However, the sheet 102 may be arranged in any other suitable manner.

2. The Displacement Device

The displacement device 130 of the preferred embodiment functions to influence the volume of the fluid 112 to deform at least a portion of the fluid vessel 127 from the retracted volume setting to the extended volume setting and, ultimately, deforming a particular region 113 of the surface 115. The displacement device 130 preferably functions to expand at least a portion of the fluid vessel 127, but may alternatively function to contract at least a portion or any other suitable manipulation of at least a portion of the fluid vessel 127. The displacement device 130 preferably modifies the volume of the fluid 112 by (1) modifying the volume of the existing fluid in the fluid vessel 127, or (2) adding and removing fluid to and from the fluid vessel 127. The displacement device 130 may, however, influence the volume of the fluid 112 by any suitable device or method. Modifying the volume of the existing fluid in the fluid vessel 127 may have an advantage of lesser complexity, while adding and removing fluid to and from the fluid vessel 127 may have an advantage of maintaining the deformation of the surface 115 without the need for additional energy (if valves or other lockable mechanisms are used). When used with a mobile phone device, the displacement device 130 preferably increases the volume of the fluid 112 within the fluid vessel 127 by approximately 0.003-0.1 ml. When used with this or other applications, however, the volume of the fluid may be increased (or possibly decreased) by any suitable amount. The variations of the displacement device 130 described below refer to modifying the volume of the fluid to expand the cavity 125, but may be applied to any other suitable portion of the fluid vessel 127.

Figure 5A:
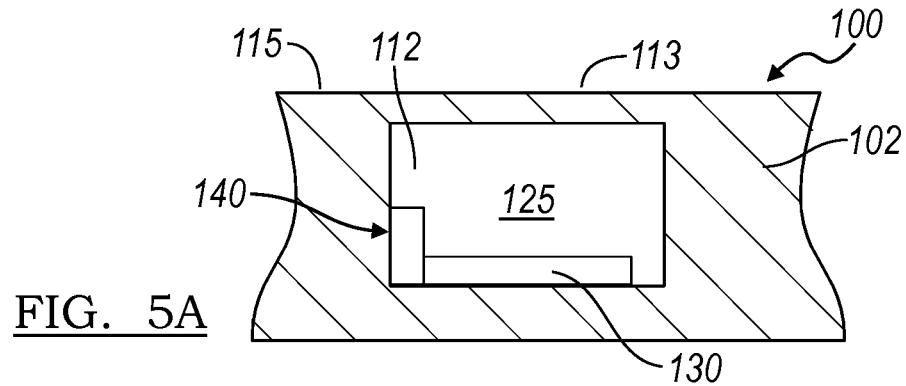
FIGS. 5a and 5b are cross-sectional views of the sheet, the cavity, the sensor, and a displacement device that modifies the existing fluid in the cavity, with the cavity in a retracted volume setting and an expanded volume setting, respectively.
Figure 5B:
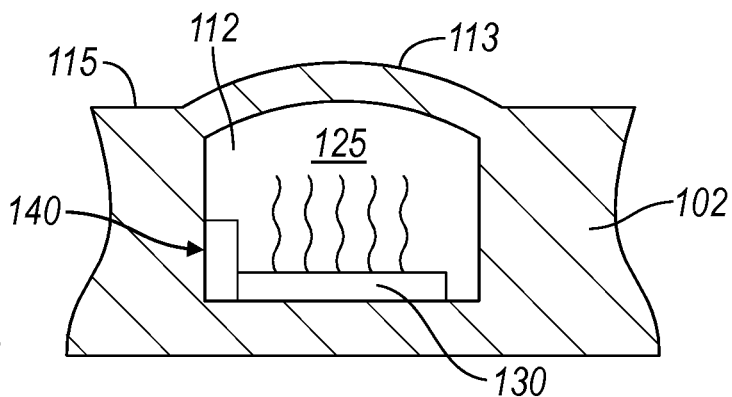

Modifying the existing fluid in the cavity 125 may be accomplished in several ways. In a first example, as shown in FIGS. 5a and 5b, the fluid may be an expandable fluid and the displacement device 130 may include a heating element that heats the expandable fluid, thereby expanding the volume of the existing fluid in the cavity 125 (according to the ideal gas law, PV=nRT). The heating element, which may be located within, adjacent the cavity 125, or any other location suitable to providing heat to the fluid, is preferably a resistive heater (made of a material such as TaN or Nichrome). In a second example, the fluid may include an expandable substance, such as plastic expandable microspheres. In a third example, the fluid may include paraffin. While these are three examples, the displacement device 130 can be any other suitable device or method that ultimately expands the cavity 125 from the retracted volume setting to the extended volume setting by modifying the existing fluid in the cavity 125.

Figure 6:
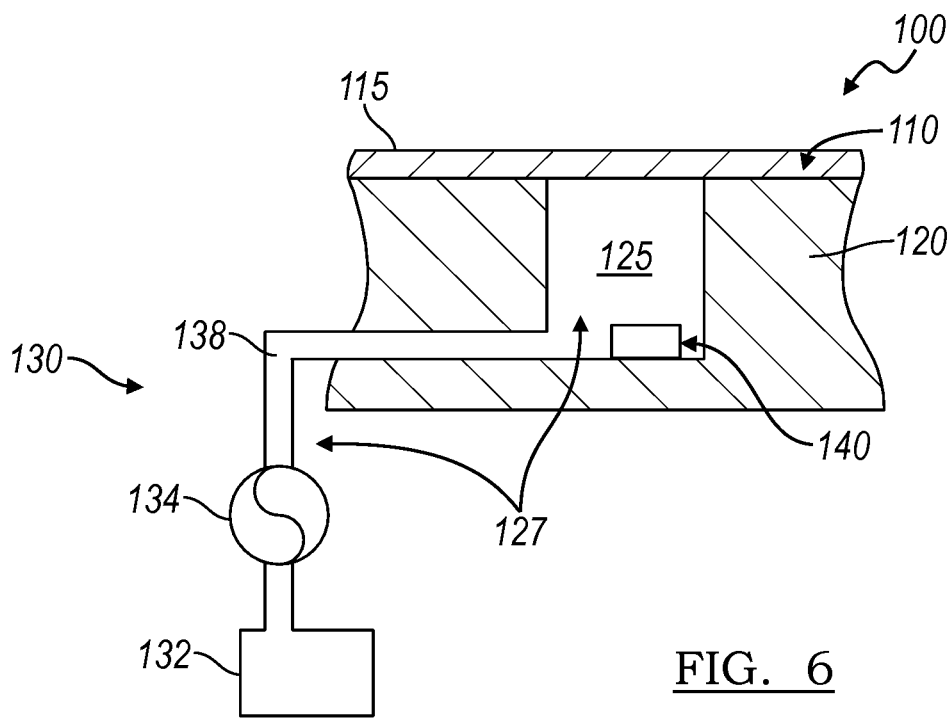
FIG. 6 is a schematic view of the sheet, the cavity, the sensor, and a displacement device of a first example that displaces additional fluid into the cavity.
Figure 7:
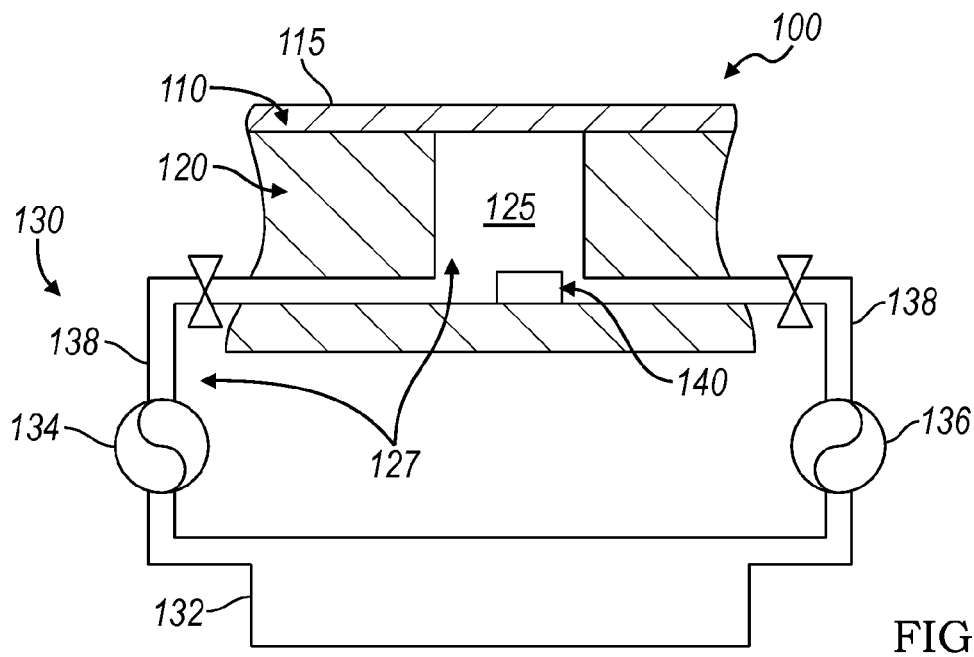
FIG. 7 is a schematic view of the sheet, the cavity, the sensor, and a displacement device of a second example that displaces additional fluid into the cavity.
Figure 8A:
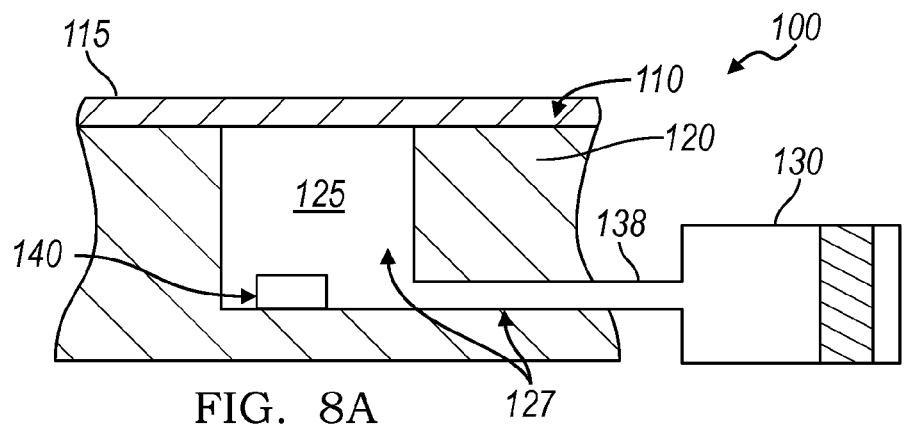
FIGS. 8a and 8b are schematic views of the sheet, the cavity, the sensor, and a displacement device of a third example that displaces additional fluid into and out of the cavity, with the cavity in a retracted volume setting and an expanded volume setting, respectively.
Figure 8B:
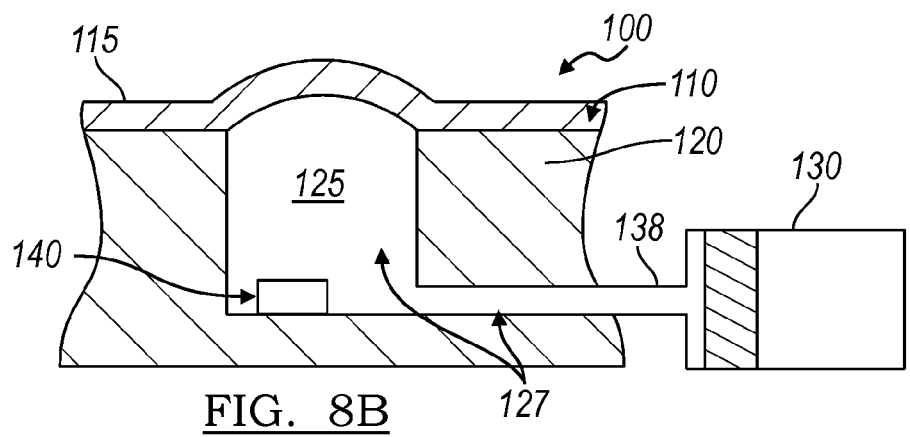

Adding and removing fluid to and from the cavity 125 may also be accomplished in several ways. In a first example, as shown in FIG. 6, the displacement device 130 includes a reservoir 132 to hold additional fluid and a pump 134 to displace fluid from the reservoir 132 to the cavity 125. The reservoir 132 is preferably remote from the cavity 125 (and connected by a channel 138 or other suitable device), but may alternatively be located adjacent the cavity 125 and connected directly to the cavity 125. A portion of the channel 138 is preferably a micro-fluidic channel (having cross-section dimensions in the range of 1 micrometer to 1000 micrometers), but depending on the size and costs constraints of the user interface system 100, the channel 138 may have any suitable dimensions. The pump 134 is preferably a micropump (such as pump #MDP2205 from ThinXXS Microtechnology AG of Zweibrucken, Germany or pump #mp5 from Bartels Mikrotechnik GmbH of Dortmund, Germany), but may be any suitable device to pump fluid from one location to another. The pump 134 is preferably located at a distance from the cavity 125, and is preferably connected to the cavity 125 by a channel 138. To extend the cavity 125 from a retracted volume setting to the extended volume setting, the pump 134 displaces fluid from a reservoir 132, through the channel 138, and into the cavity 125. To retract the cavity 125 from the extended volume setting to the retracted volume setting, the pump 134 preferably "vents" or pumps in a reverse direction from the cavity 125 to the reservoir 132. In a second example, as shown in FIG. 7, the displacement device 130 includes a reservoir 132 to hold additional fluid, a first pump 134 to displace fluid from the reservoir 132 to the cavity 125, a second pump 136 to displace fluid from the cavity 125 to the reservoir 132, a first valve located between the first pump 134 and the cavity 125, and a second valve located between the cavity 125 and the second pump 136. To extend the cavity 125 from the retracted volume setting to the extended volume setting, the first valve is opened, the second valve is closed, and the first pump 134 displaces fluid from the reservoir 132, through the channel 138, and into the cavity 125. To retract the cavity 125 from the extended position to the retracted position, the first valve is closed, the second valve is opened, and the second pump 136 displaces fluid from the cavity 125, through the channel 138, and into the reservoir 132. In other respects, the second example is similar to the first example above. The user interface system 100 may omit the second pump 136 and simply retract the cavity 125 from the extended volume setting to the retracted volume setting by opening the second valve and allowing the cavity 125 to vent or "drain" into the reservoir 132 (potentially assisted by the elasticity of the sheet 102 returning to an un-deformed state). In a third example, as shown in FIGS. 8a and 8b, the displacement device 130 includes an actuator, such as a linear actuator, that displaces fluid into and out of the cavity 125. To extend the cavity 125 from a retracted volume setting to the extended volume setting, as shown in FIG. 8a, the linear actuator displaces fluid through the channel 138 and into the cavity 125. To retract the cavity 125 from the extended volume setting to the retracted volume setting, as shown in FIG. 8b, the linear actuator draws fluid in a reverse direction from the cavity 125 to the reservoir 132. In other respects, the third example is similar to the second example above. While these are three examples, the displacement device 130 can be any other suitable device or method that ultimately expands the cavity 125 from the retracted volume setting to the extended volume setting by adding and removing fluid to and from the cavity 125.

Although the cause of the deformation of a particular region 113 of the surface 115 has been described as a modification of the volume of the fluid in the cavity 125, it is possible to describe the cause of the deformation as an increase in the pressure below the surface 115 relative to the pressure above the surface 115. When used with a mobile phone device, an increase of approximately 0.1-10.0 psi between the pressure below the sheet 102 relative to the pressure above the sheet 102, is preferably enough to deform a particular region 113 of the surface 115. When used with this or other applications, however, the modification of the pressure may be increased (or possibly decreased) by any suitable amount.

3. The Deformation of the Surface

As shown in FIG. 2, The fluid vessel 127 of the preferred embodiment functions to hold a volume of fluid 112 and to have at least two volumetric settings: a retracted volume setting (as shown in FIG. 2a for the variation of the fluid vessel 127 that includes a cavity 125) and an expanded volume setting (shown in FIG. 2b for the variation of the fluid vessel 127 that includes a cavity 125). Alternatively, there may be a plurality of volume settings or a dynamic range of volume settings. The fluid 112 is preferably a substantially incompressible fluid, but may alternatively be a compressible fluid. The fluid 112 is preferably a liquid (such as water, glycerin, or ethylene glycol), but may alternatively be a gas (such as air, nitrogen, or argon) or any other substance (such as a gel or aerogel) that expands the cavity 125 and deforms the surface 115. The fluid 112 may also function to direct selected wavelengths of light, such as UV light, to desired portions of the sheet 102, due to wavelength specific refractive index changes. In the extended volume setting, the cavity 125 deforms the particular region 113 of the surface 115 above the plane of the other regions of the surface 115. When used with a mobile phone device, the cavity 125 preferably has a diameter of 2-10 mm. When used with this or other applications, however, the cavity 125 may have any suitable dimension.

The shape of the deformation of the particular region 113 is preferably one that is felt by a user through their finger and preferably acts as (1) a button that can be pressed by the user (as shown in FIG. 9), (2) a slider that can be pressed by the user in one location along the slider or that can be swept in a sliding motion along the slider (such as the "click wheel" of the Apple iPod (second generation)) (as shown in FIGS. 10 and 11), and/or (3) a pointing stick that can be pressed by the user from multiple directions and/or locations along the surface whereby the user is provided with tactile feedback that distinguishes a first directional touch from a second directional touch and/or a touch in a first location from a touch in a second location (such as the pointing stick trademarked by IBM as the TRACKPOINT and by Synaptics as the TOUCHSTYK (which are both informally known as the "nipple")) (as shown in FIG. 12). The deformation may, however, act as any other suitable device or method that provides suitable tactile guidance and feedback. In the variation including a display 150, the shape of the deformation of the particular region 113 also preferably functions to minimize the optical distortion of the image underneath the deformed particular region 113.

4. The Capacitive Sensor Stem

In the preferred embodiments of the present invention, a capacitive sensor system 140 preferably receives a user input on the surface 115. However, as mentioned in U.S. application Ser. No. 12/497,622, the sensor 140 may be a resistive sensor and/or any other suitable type of sensor to sense the presence of a user input at the particular region 113. Alternatively, the capacitive sensor system 140 may also receive a user input substantially adjacent to the surface 115, for example, in the variation of the user interface that is applied to a mobile phone with a main surface 115 and a side surface substantially perpendicular to the main surface 115, the capacitive sensor system 140 may function to detect a user input on the side surface. As shown in FIG. 14, the capacitive sensor system 140 is arranged into an array of the type described as the second variation of the array in U.S. application Ser. No. 12/497,622 for a plurality of cavities 125. Also as described in U.S. application Ser. No. 12/497,622, the presence of a user input is preferably detected by detection of a change in the electric field and/or capacitance between a first conductor and a second conductor that both correspond to a particular region 113. The capacitive sensor system 140 of the preferred embodiments functions to detect the presence of a user input at locations of the surface 115 that do not include a particular region as well as a user input at the particular region 113. The capacitive sensor system 140 of the preferred embodiments preferably functions to detect the presence of a user input that deforms the surface 115 and/or a user input that does not deform the surface 115. Because the sensor 140 is preferably a capacitive sensor that utilizes electric fields for user input detection, the capacitive sensor system 140 preferably also accommodates to capacitance changes that result from expansion and retraction of the cavities 125 (for example, the increased height of fluid in the cavity 125 may affect the capacitance and/or the increased volume of fluid within the cavity 125 may affect the capacitance) and detects user input in both the expanded and retracted states of the cavities 125.

Figure 14A:
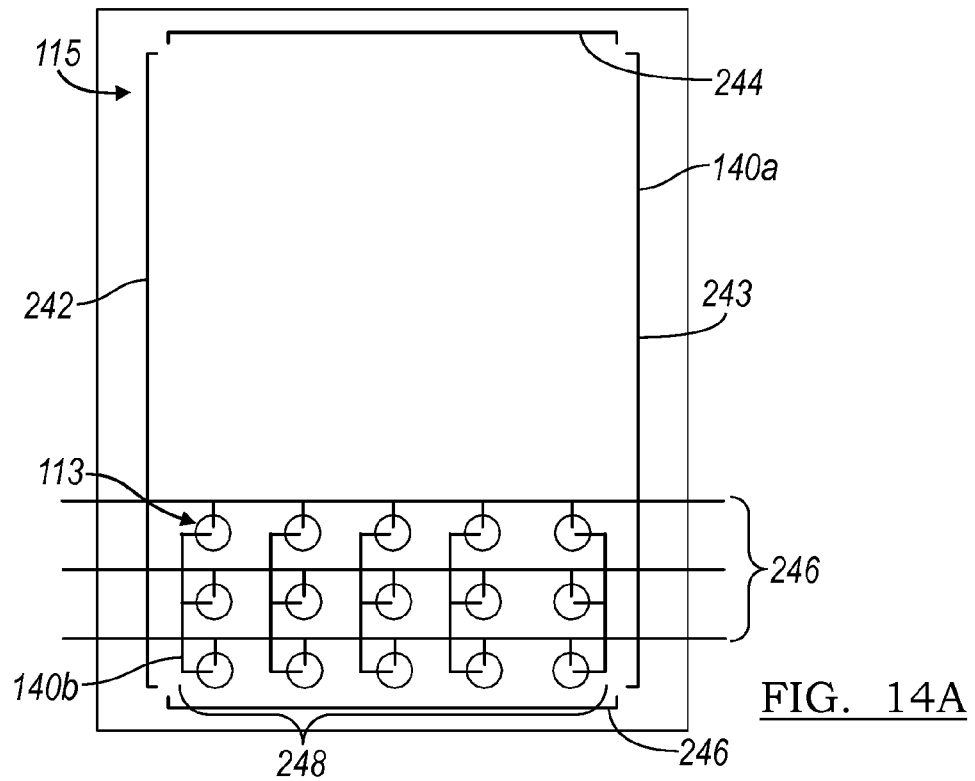
FIGS. 14a and 14b are schematic views of the first and second variations of the first preferred embodiment.
Figure 14B:
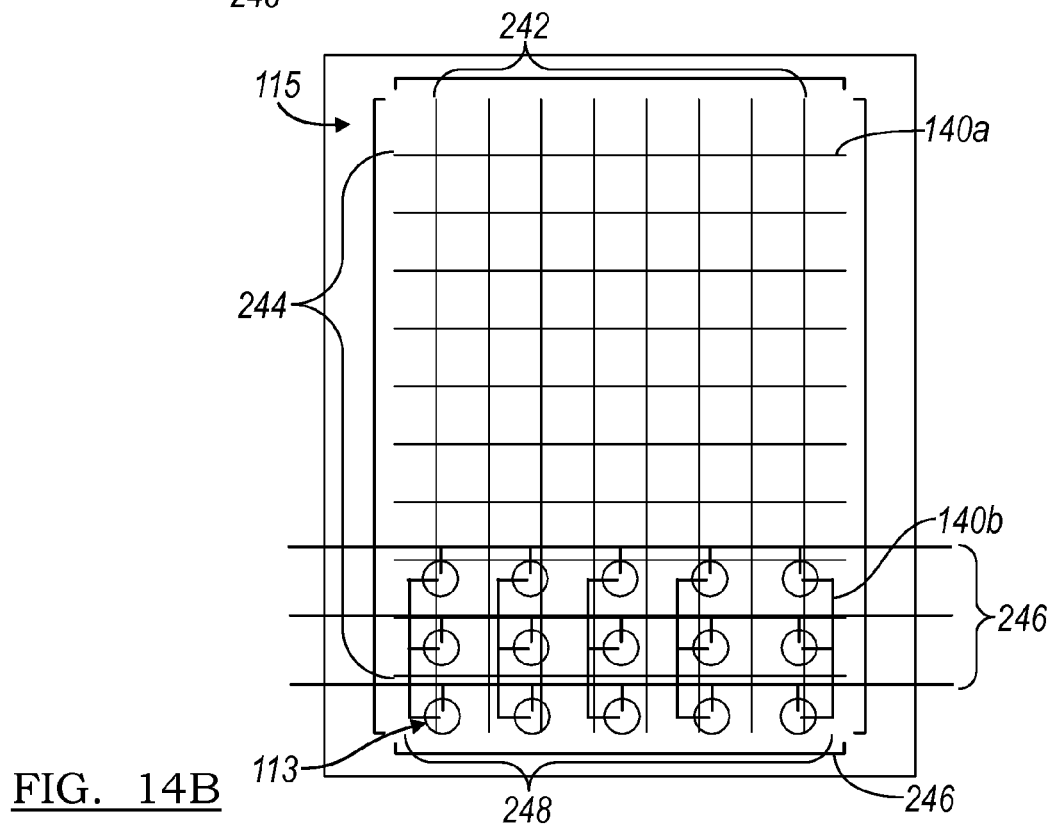

Because the deformed particular region 113 preferably functions as a guide for a user input substantially proximal to the particular region 113, the capacitive sensor system 140 preferably detects a user input substantially proximal to the particular region 113 at a higher sensitivity than other regions of the surface 115 the increase the accuracy of detecting a user input that is provided substantially proximal to the deformed particular region 113. The capacitive sensor system 140 of the second sensitivity may be of a higher location detection sensitivity than the first sensitivity, for example, the detection of the X-Y location of the user input relative to the surface 115 is more accurately determined (e.g., with a lower margin of error) or the distinction between two user inputs that are provide substantially close to each other may be higher in the second sensitivity than the first sensitivity, but may alternatively be of a higher detection sensitivity than the first sensitivity, for example, the presence of a user input is more accurately detected. Alternatively, the second sensitivity detects attributes of the deformed particular region at a higher accuracy than the first sensitivity, for example, the second sensitivity may detect the height of the deformed particular region 113, the speed of inward deformation of the deformed particular region 113 by the user, and/or the degree of inward deformation of the deformed particular region 113 by the user at a higher sensitivity than the first sensitivity. However, the second sensitivity may be higher than the first sensitivity in detecting any other suitable characteristic of the user input, for example, magnitude of the force of the input and/or the rate of the force applied of the input. As shown in FIGS. 14*a*, 14*b*, and 15, the capacitive sensor system 140 of the preferred embodiments preferably includes a first sensor portion 140*a* that detects user input anywhere along the surface 115 at a first sensitivity and a second sensor portion 140*b* that detects a user input substantially proximal to the particular regions 113 at a second sensitivity. In a first preferred embodiment, the first and second sensor portions of the capacitive sensor system 140 are substantially independent of each other and a second preferred embodiment, the second sensor portion increases the sensitivity of the first sensor portion to the second sensitivity substantially proximal to the particular region 113 of the surface.

In the preferred embodiments, the processor 160 may function to prioritize a user input detected substantially proximal to the particular region 113. For example, the processor 160 may include a first mode that evaluates a user input provided substantially proximal to the particular region 113 at substantially the same weight as a user input provided on another region of the surface substantially concurrently and a second mode that evaluates a user input provided substantially proximal to the particular region 113 over one that is provided on another region of the surface substantially concurrently. The second mode may be particularly useful when the displacement device 130 influences the volume of fluid 112 to deform the particular region 113 of the surface. Because the particular region 113 preferably functions as a guide for a user input that may be provided substantially proximal to the particular region 113, when the particular region 113 is deformed, a user input provided substantially proximal to the particular region 113 may be more likely to be the desired input of the user while another input received at another region of the surface 113 substantially concurrently may be an unintentional input. The processor 160 may also function to activate the second sensitivity of the capacitive sensor system 160. The increased sensitivity of the second sensor portion 140*b* may increase energy consumption of the user interface system 100. To decrease the energy consumption of the user interface system 100, the processor 160 may function to active the second sensor portion 140*b* only when the increased second sensitivity is desired, for example, when a particular region 113 is deformed. Alternatively, because the detection of a characteristic of the user input in the second sensitivity may increase the amount of computing power used by the processor 160, the processor 160 may function to detect a user input at the second sensitivity only when the second sensitivity is desired, for example, when the particular region 113 is deformed. However, any other suitable type of control of the first and second sensor portions 140a and 140b may be used.

Figure 15A:
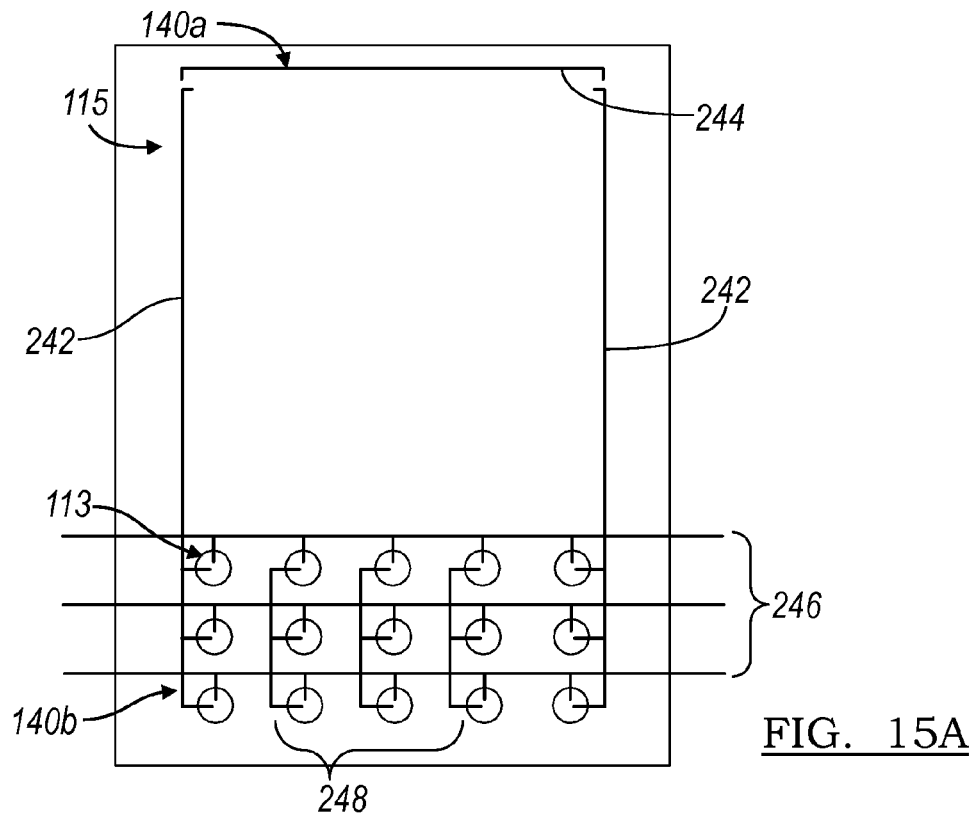
FIGS. 15a, 15b, and 15c are schematic views of the second preferred embodiment, user input locations with respect to the second preferred embodiment, and the method for determination of input locations in the second preferred embodiment, respectively.
Figure 15B:
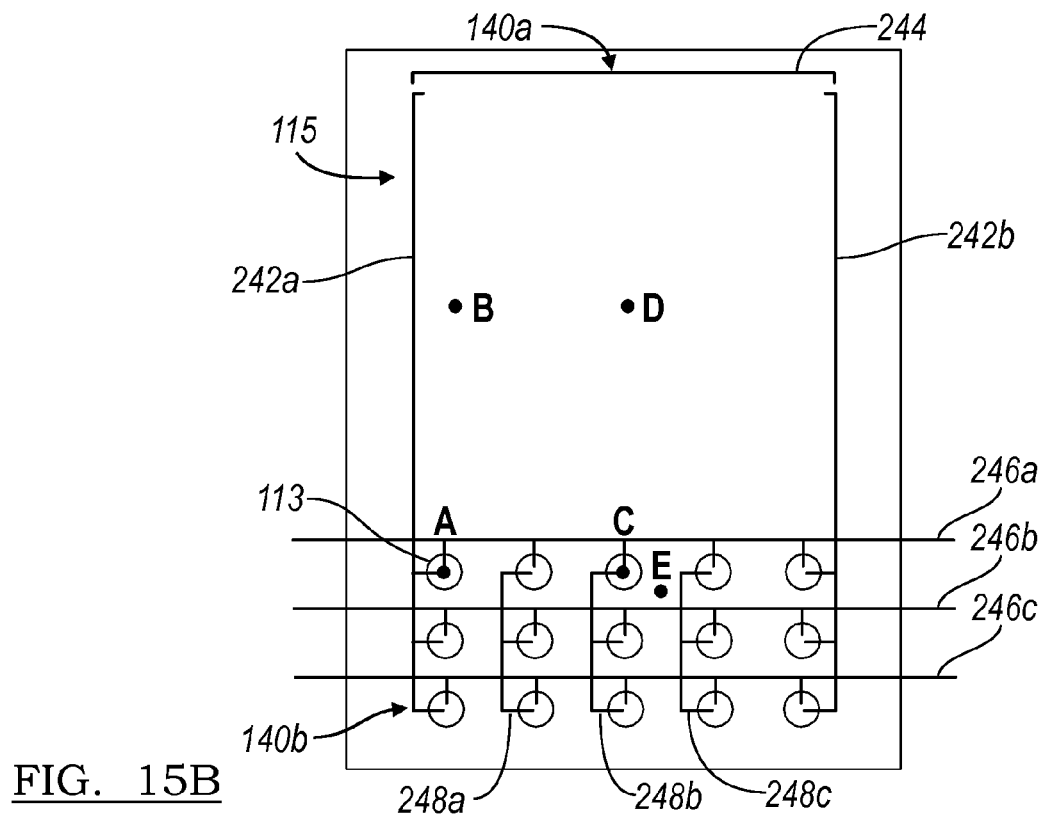

In the first preferred embodiment, as shown in FIGS. 15a and 15b, the user interface system includes a first sensor portion 140a that includes at least one horizontal conductor 244 and at least one vertical conductor 242 and functions to detect user input anywhere along the surface 115 and a second sensor portion 140b that includes a set of first conductors 246 and a set of second conductors 248 and functions to detect user input only at the particular regions 113. In this first preferred embodiment, the processor 160 functions to determine which of the first and second sensing systems 140a and 140b to be used for detection of user input at any one time. For example, the first sensor portion 140a may be the default sensing system until an application of the device activates the expansion of the cavities 125 and deforms the particular regions 113. Once the expansion of the cavities 125 is activated, the second sensor portion 140b is then used to provide substantially more accurate details of user input (for example, speed of user input, direction of user input, pressure of user input, or the amount of inward deformation of the particular region 113) at the particular regions 113. Once the cavities 125 are retracted, the user interface system preferably returns to utilizing the first sensor portion 140a. Alternatively, both the first sensor portion 140a and the second sensor portion 140b may be used concurrently when the expansion of the cavities 125 is activated to allow for increased accuracy in the details of the user input at the particular regions 113 as well as detection of user input at locations away from the portion of the surface 115 that includes the particular regions 113. The user interface system of the first preferred embodiment may include a first driver chip that cooperates with the first sensor portion 140a and a second driver chip that cooperates with the second system 140b, but may alternatively include one driver chip that drives both the first and second sensing systems 140a and 140b. However, any other suitable arrangement of the driver chips and the processor 160 may be used.

As shown in FIGS. 15a and 15b, the first sensor portion 140a may be of a type that is known in the art and the second sensor portion 140b is preferably one that has been described in U.S. application Ser. No. 12/497,622. For example, as shown in FIG. 15a, the first sensor portion 140a may include vertical conductors 242 and 243 substantially at the left and right edges of the surface 115 and horizontal conductors 244 and 246 substantially at the top and bottom edges of the surface 115. An electric field is provided by a vertical conductor 242 and a horizontal conductor 244 that is detected by the other vertical conductor 243 and the other horizontal conductor 246. An example of electric field generation may be by transmitting a current through the vertical conductor 242 and the horizontal conductor 244 that creates an electric field that is detected by the by the other vertical conductor 243 and the other horizontal conductor 246. However, any other suitable method of generating an electric field may be used. The presence of a finger may cause disruptions and/or fluctuations in the electric field that are detected and the location of the finger may be triangulated from the electric field that is felt by the electric field receivers vertical conductor 243 and horizontal conductor 246. Alternatively, an electric field may be provided only by the horizontal conductors 244 and 246 or only by the vertical conductors 242 and 243. However, any other suitable arrangement of providing detectable electric fields may be used. In a second example, as shown in FIG. 14b, the method known in the art of projected capacitance may be used to detect user input. The first sensor portion 140a of this variation preferably includes a grid of vertical conductors 242 and horizontal conductors 244 where the location of electric field fluctuations due to a finger or any other suitable body part or object is more accurately detected, allowing advanced touch sensing applications such as multi-finger touch. In a third example, the first sensor portion 140a may also sense the presence and the location of the user input by using surface capacitance where the sheet 102 may include a layer of conductive material to which a voltage is applied. The conductive layer is preferably transparent and/or index matched with the rest of the sheet 102 and preferably is located away from the surface 115. When the finger of the user comes into contact with the surface 115, the proximity of the finger with the conductive layer creates a change in the capacitance and the resulting change capacitance at various static locations along the surface 115 is measured to triangulate the location of the finger of the user. The conductors of the first sensor portion 140a may be arranged diagonally, in a cross pattern, or any other suitable orientation. The conductors of the first sensor portion 140a may also be of any other suitable shape (for example, the conductors may resemble a sine wave), size, or geometry. However, any other suitable capacitive touch system known in the art may be used for the first sensor portion 140a and the second sensor portion 140b.

As described in U.S. application Ser. No. 12/497,622, the second sensor portion 140b may include a first and second conductor at a particular region 113 and the distance between the first and second conductor changes when a user provides an input at the particular region to detect and receive a user input. The distance between first and second conductor at the particular region 113 preferably decreases as a user input is provided at the particular region 113 (for example, one that inwardly deforms the particular region 113), but may alternatively increase. The first and second conductor may alternatively come into contact to substantially detect a user input substantially proximal to the particular region 113. Because the second sensor portion 140b includes conductors that are configured to detect a user input at the particular region 113, the sensitivity for detection of a user input, determining the location of the user input, and/or detecting any other suitable characteristic of the user input may be increased. However, any other suitable arrangement of conductors may be used for the second sensor portion 140b to provide the higher second sensitivity to a user input provided substantially proximal to the particular region 113.

The second preferred embodiment, as shown in FIGS. 15a and 15b, preferably includes a sensing system that allows for the detection of both user inputs at a particular region 113 and anywhere along the surface 115 at the second and first sensitivities, respectively, without the need of an additional sensor system (for example, a first sensor system to detect the presence and/or properties of user inputs at a particular region 113 and a second sensor system to detect the presence and/or properties of user inputs elsewhere along the surface 115). The sensor 140 of the second preferred embodiment preferably utilizes one driver chip that cooperates to detect both user inputs at a particular region 113 and anywhere else along the surface 115. In a first variation of the second preferred embodiment, the sensor 140 preferably includes a first sensing portion 140a that includes elongated vertical conductors 242 (shown as 242a and 242b), and non-array horizontal conductor 244 with a first sensitivity to a user input and a second sensing portion 140b that includes horizontal array conductors 246 (three horizontal array conductors 246a, 246b, and 246c are shown, but may be any other suitable number), vertical array conductors 248 (three vertical array conductors 248a, 248b, and 248c are shown, but may be any other suitable number), that increases the sensitivity to the second sensitivity substantially proximal to the particular region 113 of the surface. The horizontal and vertical array conductors 246 and 248 of the second sensor portion 140b are preferably of the type of conductor 142 and 144, respectively, as described in U.S. application Ser. No. 12/497,622. The elongated vertical conductors 242 of the first sensor portion 140a are preferably of the same conductor type as the vertical array conductors 248 and extend through a column of cavities 125 to a portion of the surface 115 that does not include a particular region 113. In the substantially rectangular surface 115 as shown in FIGS. 15a and 15b, one elongated vertical conductor 242 preferably corresponds to the left most column of cavities 125 and a second elongated vertical conductor 242 preferably corresponds to the right most column of cavities 125 and both preferably extend from the bottom corners of the rectangle to the upper corners of the rectangle, preferably forming a bracket around a substantially large portion of the surface 115. The non-array horizontal conductor 244 is preferably of the same conductor type as the horizontal array conductors 246 and is preferably located at a portion of the surface that does not include a particular region 113. In the substantially rectangular surface 115 as shown in FIGS. 15a and 15b, the non-array horizontal conductor 244 preferably extends from the two side corners of the rectangle, preferably cooperating with the horizontal array conductor 246c corresponding with the bottom most row of cavities 125 to form a bracket around a substantially large portion of the surface 115. In other words, the elongated vertical conductors 242, the non-array horizontal conductor 243, and the horizontal array conductor 246c corresponding to the bottom most row of the cavities 125 may resemble the conductors of the first example of the first sensor portion 140a of the first preferred embodiment. Alternatively, an additional non-array horizontal conductor 244 may be used instead of the horizontal array conductor 246 corresponding to the bottom most row of the cavities 125 to form a bracket around a substantially large portion of the surface 115. Alternatively, the elongated vertical conductors 242 and non-array horizontal conductor 244 may be arranged diagonally, in a cross pattern, or any other suitable orientation. The elongated vertical conductors 242 and non-array horizontal conductor 244 may also be of any other suitable shape (for example, the conductors may resemble a sine wave), size, or geometry. For example, the portion of the elongated vertical conductor 242 that corresponds to a particular region 113 may be of the same conductor type and/or geometry as the vertical array conductors 248 while a second portion of the elongated vertical conductor 242 that corresponds to a portion of the surface 115 that does not include a particular region 113 may be of a different conductor type and/or geometry. However, any other suitable material or arrangement of the horizontal and vertical array conductors 246 and 248, elongated vertical conductor 242, and non-array horizontal conductor 244 may be used.

Though the sensing system of the second preferred embodiment is described in the substantially rectangular surface 115 as shown in the FIGURES, the sensing system may be accommodated to any other suitable geometry of the surface 115 (for example, circular or octagonal) and may also be accommodated to any suitable type of surface plane (for example, substantially flat or curved). Additionally, the particular regions 113 may be arranged in any suitable pattern. The particular regions 113 may also occupy a substantial portion of the surface 115. The sensing system of this variation may utilize a second horizontal array conductor 246 to function as the non-array horizontal conductor 244. However, any other suitable arrangement of the sensing system may be used.

Similar to the first example of the first sensor portion 140a of the first preferred embodiment, an electric field is provided by a conductor (for example, by means of a current through the conductor) and the electric field is detected by a second conductor such that disruptions and/or fluctuations caused by the presence of a finger in the electric field may also be detected. The second conductor may function to scan across the plurality of electric fields at a plurality of combinations of conductor pairs to detect a user input. Alternatively, the second conductor may act as a conductor that is connected to ground and cooperates with the first conductor to create an electric field that may be disrupted by the presence of a finger. In the second preferred embodiment, because a user input at the particular region 113 and the portions of the surface 115 that do not include a particular region 113 are preferably detected simultaneously, the user interface system preferably also functions to discern between a user input at a particular region 113 and a user input at a portion of the surface 115 that does not include a particular region 113. This may be achieved using one of several variations of the capacitive sensor system 140.

In a first variation of the second preferred embodiment, currents are transmitted through each of the vertical array conductors 248 and the elongated vertical conductors 242 and the horizontal array conductors 246 and the non-array horizontal conductor 244 each function to detect the change in the electric fields generated by the vertical conductors 248 and 242. The electric signal that is transmitted through each of the vertical array conductors 248 is preferably at a first frequency and the electric signal that is transmitted through the elongated vertical conductors 242 is preferably at a second frequency, where the first and second frequencies are substantially different. In particular, the first and second frequencies are preferably not harmonics of each other and the frequency offset between the first and second frequencies is preferably not of the frequency of the electrical grid (for example, 60 hertz in North America) or some other frequency that is commonly present in electronic devices (for example, the refresh frequency in a liquid crystal display or LCD) to decrease interference. As a result, of the different frequencies transmitted through conductors that correspond to both the particular regions 113 and the portions of the surface 115 that do not include particular regions 113 and through conductors that correspond only to the particular regions 113, the electric field conductors may discern a user input at the particular region 113 from a user input elsewhere on the surface 115. An example of a method of discerning such user input is: 1. Detect the presence of a disruption in the electric field and/or capacitance of the first frequency, 2. Detect the presence of a disruption in the electric field and/or capacitance of the second frequency, 3. Compare the magnitude of the disruption of the electric field and/or capacitance in the two frequencies, and 4. Determine the location of the disruption relative to the particular region 113. This method is preferably carried out by a processor 160 through software and digital signal processing, but may alternatively be carried out through electrical circuitry, such as an FPGA. As shown in FIG. 15b, the user interface system preferably discerns between a user input at the particular region 113 (input A), at a portion of the surface 115 that does not include a particular region 113 but is in relative proximity to an elongated vertical conductor 242 (Input B), at a particular region 113 that is relatively central to the portion of the surface 115 that includes a group of particular regions 113 (Input C), at a portion of substantially central to a portion of the surface 115 that does not include a particular region 113 (Input D), and at a portion of the surface 115 that includes a particular region 113 but not at a particular region 113 (Input E). However, the user interface system preferably also functions to discern between any other suitable locations of user inputs. To save power and processing, the electric field of the second frequency may be employed only when the cavities 125 are in the expanded state. When the cavities 125 are retracted, the elongated vertical conductors 242a and 242b, the horizontal array conductor 246c and the non-array horizontal 244 may be employed using an electric field of the first frequency to determine the location of a user input while other conductors are inactive.

Figure 15C:
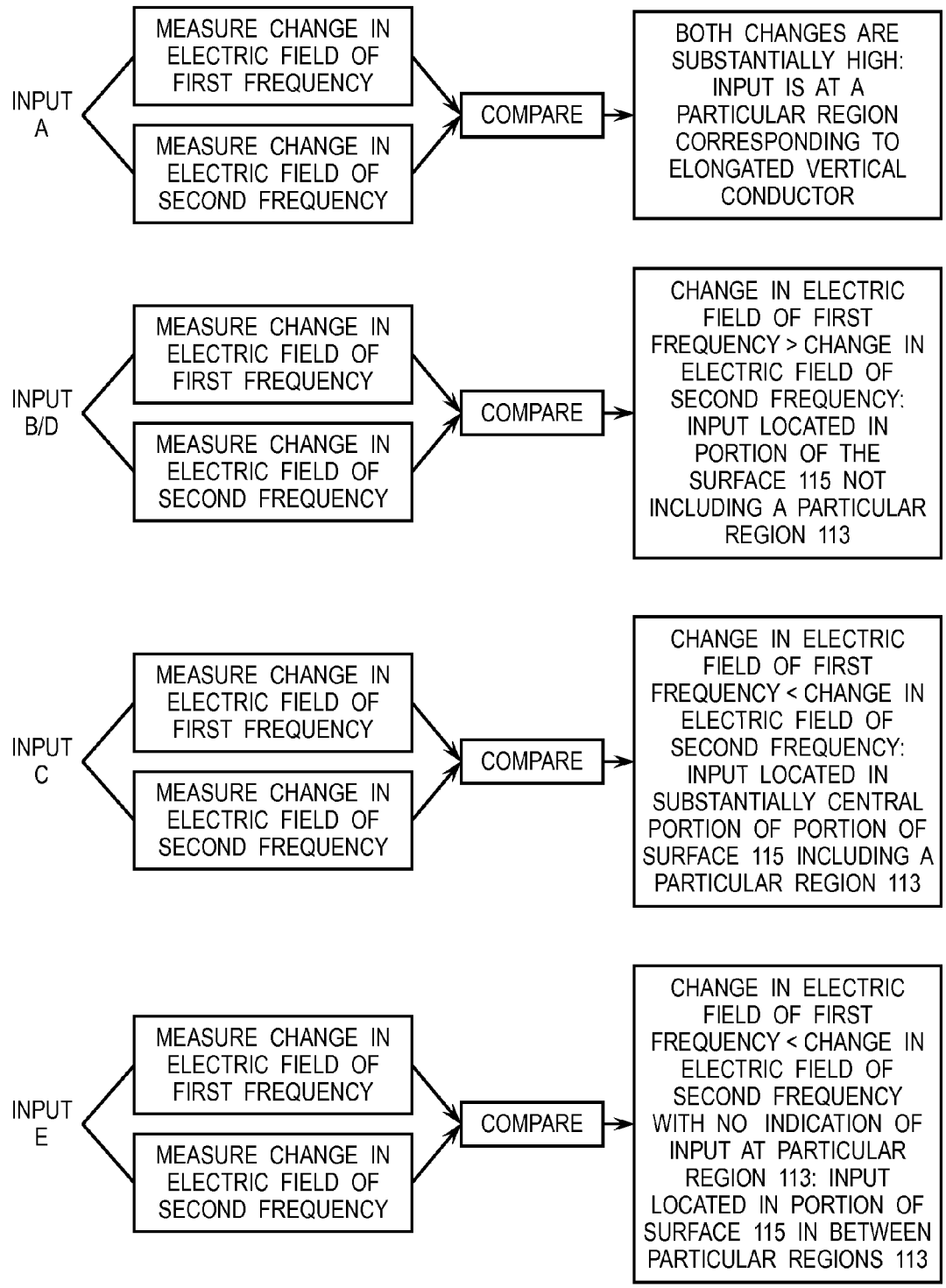

It is well known in the art that the human body acts as a dielectric and increases the capacitance between two conductors when placed within the electric field that between the conductors. The closer a part of the human body (for example, the finger of the user) is placed to a conductor, the overall larger the change in the capacitance between the conductors. The processor 160 may function to utilize this property of electric fields and capacitance to determine the location and the type of user input that is detected, as shown in FIG. 15c. When the user provides an Input A at the particular region 113, because of the proximity of the input to both elongated vertical conductor 242a and vertical array conductor 248a, the change in the electric field of the first frequency as received by horizontal array conductor 246a is substantially large and the change in the electric field of the second frequency as received by the horizontal array conductor 246a is also substantially large. Because both changes are substantially large, the user interface system may infer that the input is the portion of the surface 115 that includes a particular region 113 and will preferably primarily detecting changes in the electric field of the second frequency. To determine that the user input is located at the particular region 113, the change in the electric fields of the first and second frequency as felt by horizontal array conductors 246b and 246c may also be used to triangulate the location of the user input. Alternatively, the elongated vertical conductor 242a may come into contact with the horizontal array conductor 246a at the particular region 113 and provide a second signal to indicate that the user input is at the particular region 113. However, any other suitable method to determine that the user input is located at the particular region 113 may be used.

When the user provides an Input B, because of the proximity of the input to the elongated vertical conductor 242a and relative substantial distance from vertical array conductors 248a, b, and c, the change in the electric field of the first frequency is larger than the change in the electric field of the second frequency as received by any of the horizontal array conductors 246a, b, and c relative to an Input A or an Input C. The user interface system may determine that the user input is located at the portion of the surface 115 that does not include a particular region 113 and will preferably primarily detect changes in the electric field of the first frequency through use of the non-array horizontal conductor 244, elongated vertical conductors 242a and b, and horizontal array conductor 246c. The location of the Input B may be determined using methods known in the art for triangulating the location of a user input using the four conductors, for example, comparing the change in the electric field of the first frequency as received by the non-array horizontal conductor 244 and the horizontal array conductor 248c. The same methods may be applied to determining an Input D that is substantially central to the portion of the surface 115 that does not include a particular region 113.

When the user provides an Input C, similarly to when the user provides an Input A, the change in the electric field of the second frequency as felt by horizontal array conductor 246a is substantially large. However, the change in the electric field of the first frequency as felt by the horizontal array conductor 246a is smaller than in the case of Input A. The user interface system may infer that the use input is at the portion of the surface 115 that includes the particular regions, but is located at a location substantially far from the elongated vertical conductors 242a and b and will preferably switch to detecting only changes in the electric field of the second frequency. To determine the location of the user input 113, similar to the case of Input A, the change in the electric fields of the first and second frequency as felt by horizontal array conductors 246b and c may also be used to triangulate the location of the user input. Alternatively, the vertical array conductor 248b may come into contact with the horizontal array conductor 246a at the particular region 113 and provide a second signal to indicate that the user input is at the particular region 113. However, any other suitable method to determine that the user input is located at the particular region 113 may be used.

When the user provides an Input E, similarly to the case of Input C, the change in the electric field of the first frequency as felt by the horizontal array conductor 246a is substantially small while the change in the electric field of the second frequency as felt by horizontal array conductor 246a is substantially large and the user interface system preferably infers that the user input is located at a portion of the surface 115 that includes a particular region 113. To determine the location of the Input E, the change in the electric fields of the first and/or second frequency as felt by horizontal array conductors 246b and c may also be used to triangulate the location of the user input. For example, if the change in the electric field of the second frequency as felt by the horizontal array conductor 246a is substantially equal than as felt by the horizontal array conductor 246b, then the user interface system may infer that the user input is located in between a particular region 113 that corresponds to the horizontal array conductor 246a and a particular region 113 that corresponds to the horizontal array conductor 246b. Alternatively, in the variation of the user interface system where the vertical conductor and the horizontal conductor of a particular region 113 come into contact when a user input is provided at the particular region 113, the absence of contact while a substantially large change in the electric field is detected may be used to determine that the user input is in close proximity to a particular region 113. However, any other suitable method to determine the location of the Input E may be used.

Alternatively, the processor 160 may determine the location of the of the user input and, when the user input is detected to be at a particular region 113, the processor 160 may primarily detect changes in the electric field of the second frequency. To determine that the user input is located at the particular region 113, the change in the electric fields of the first and second frequency as detected by the sensing system may be used to triangulate the location of the user input. The processor 160 may function to evaluate the changes in the electric fields of the first and second frequencies independently to determine the location of the user input, but may alternatively evaluate changes in the electric fields of the first and second frequencies together, which may achieve a more accurate determination of user input location. Alternatively, the elongated vertical conductor 242a may come into contact with the horizontal array conductor 246a at the particular region 113 and provide a second signal to indicate that the user input is at the particular region 113. However, any other suitable method to determine that the user input is located at the particular region 113 may be used.

In a second variation of the second preferred embodiment, the second sensor portion 140b may include a first and second conductor at a particular region 113, as described in U.S. application Ser. No. 12/497,622. As described above in the first preferred embodiment, the distance between the first and second conductor changes when a user provides an input at the particular region to detect and receive a user input. The distance between first and second conductor at the particular region 113 preferably decreases as a user input is provided at the particular region 113 (for example, one that inwardly deforms the particular region 113), but may alternatively increase. The first and second conductor may alternatively come into contact to substantially acutely detect a user input substantially proximal to the particular region 113. The first and second conductor may alternatively come into contact to substantially acutely detect a user input substantially proximal to the particular region 113. Because the second sensor portion 140b includes conductors that are configured to detect a user input at the particular region 113, the sensitivity for detection of a user input, determining the location of the user input, and/or detecting any other suitable characteristic of the user input may be increased. However, any other suitable arrangement of conductors may be used for the second sensor portion 140b to provide the higher second sensitivity to a user input provided substantially proximal to the particular region 113.

In a third variation of the second preferred embodiment, the sensor system may substantially similar or identical to that of the first sensor portion 140a of the first preferred embodiment. In this variation, the sensor system functions to determine the location of the user input. However, because the sensor system as described in U.S. application Ser. No. 12/497,622 is not used, substantially more accurate details of user input (for example, speed of user input, direction of user input, pressure of user input, or the amount of inward deformation of the particular region 113) may not be detected.

The sensor 140 of the preferred embodiments is preferably one of the variations and arrangements described above, but may alternatively be any other suitable variation or arrangement. For example, a current of a unique frequency may be transmitted through each electric field emitting conductor (elongated vertical conductors 242 and vertical array conductors 248), resulting in a plurality of electric fields that are each of a different frequency, which may facilitate in determining the location of the user input. In a second example, the horizontal array conductors 246 and the non-array horizontal conductor 244 as the electric field emitters and the vertical array conductors 248 and the elongated vertical conductors 242 may function as the electric field receivers. In a third example, user inputs located at a particular region 113 may be detected by the a horizontal array conductor coming into contact with a vertical array conductor (or elongated vertical conductor) while user input located at a portion of the surface 115 that does not include a particular region 113 may be detected from disruptions in the electric field. However, any other suitable method that allows for user inputs both located at a portion of the surface 115 that includes a particular region 115 and at a portion of the surface 115 that does not include a particular region 115 to be detected simultaneously may be used. The sensor 140 may also function to detect the occurrence of multiple user inputs (commonly known as "multitouch"), in various combinations: multiple user inputs, each at a different particular region 113, each at various locations on the surface 115 that do not include a particular region 113, or a combination of inputs at both the particular regions 113 and at locations on the surface 115 that do not include a particular region 113.

In the user interface system 100 of the preferred embodiments, the fluid 112 may affect the electromagnetic fields that are generated within the sensor system 140, for example, the fluid itself may be conductive, the fluid may include suspensions or dispersions of particles with relevant electrical and optical properties, or the any other suitable type of fluid. For example, the fluid 112 may function as an electrical conductor or an electrical insulator that manipulates an electromagnetic field that passes through the fluid 112. In this variation, the fluid 112 may be directed within the sheet 102 to provide desired manipulations of an electromagnetic field, for example, to increase the sensitivity of the sensor system 140 at particular portions and/or to decrease the sensitivity of the sensor system at another portion. Alternatively, the processor 160 may be configured to recognize the affect that the fluid 112 may have on the electromagnetic fields of the sensor 140 and to adjust the method of detecting a user touch when effects from the fluid 112 are detected. However, any other suitable use and/or accommodation to the effects of the fluid 112 on the electromagnetic fields of the sensor system 140 may be used.

As a person skilled in the art will recognize from the previous detailed description and from the figures and claims, modifications and changes can be made to the preferred embodiments of the invention without departing from the scope of this invention defined in the following claims.

We claim:

1. A method for receiving a user input into a dynamic tactile interface comprising a tactile layer, a substrate, a displacement device, and a sensor, the tactile layer defining a tactile surface, a first region, and a plurality of particular regions different from and adjacent the first region, the particular regions are operable between a retracted setting and an expanded setting and tactilely distinguishable from the first region in the expanded setting, the substrate coupled to the first region and defining a fluid channel adjacent the particular region, the displacement device displacing fluid into the fluid channel to transition the particular region from the retracted setting to the expanded setting, and the sensor comprising a first set of conductors coincident the first region and a second set of conductors coincident the particular region, the method comprising:

at the first set of conductors, outputting a first electromagnetic field of a first frequency proximal the tactile surface;

at the second set of conductors, outputting a second electromagnetic field of second frequency proximal the tactile surface;

at the first set of conductors, detecting a first change in the first electromagnetic field;

at the second set of conductors, detecting a second change in the second electromagnetic field;

detecting an input on the tactile surface coincident the particular region in response to the second change exceeding the first change;

detecting an input on the tactile surface coincident the first region in response to the first change exceeding the second change; and detecting an input on the tactile surface along an intermediate region between a first and second particular region of the plurality of particular regions in response to the first change substantially approximating the second change.

2. The method of claim 1, wherein providing the sensor comprises arranging a first conductor in the second set of conductors substantially proximal the particular region and arranging a second conductor in the second set of conductors substantially proximal the particular region, a distance between the first conductor and the second conductor changing in response to an input on the particular region of the surface, and further comprising detecting an input on the surface proximal the particular region based on a change in the distance between the first conductor and the second conductor.

3. The method of claim 1, further comprising displacing fluid with the displacement device from the fluid vessel into the fluid channel to transition the particular region from the retracted setting to the expanded setting, the particular region offset above the first region in the expanded setting, the particular region substantially flush with the first region in the retracted setting.

4. The method of claim 1, wherein providing the sensor comprises disposing the first set of conductors and the second set of conductors along the substrate.

5. The method of claim 1, wherein providing the sensor comprises disposing a first number of the first set of conductors along the layer proximal the first region and disposing a second number of the second set of conductors along the layer coincident the deformable region, wherein the first number is less than the second number, and the first region is larger than the deformable region.

* * * * *